(12) United States Patent
Eisenhour

(10) Patent No.: US 7,735,744 B2
(45) Date of Patent: Jun. 15, 2010

(54) CONTROL OF COOLANT FLOW RATE FOR VEHICLE HEATING

(75) Inventor: Ronald S. Eisenhour, West Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 1829 days.

(21) Appl. No.: 10/797,602

(22) Filed: Mar. 11, 2004

(65) Prior Publication Data

US 2006/0157576 A1 Jul. 20, 2006

(51) Int. Cl.
*B60H 1/04* (2006.01)
*B60H 1/02* (2006.01)
*B60H 1/00* (2006.01)

(52) U.S. Cl. ............ 237/12.3 B; 237/5; 237/12.3 R; 165/202; 165/244

(58) Field of Classification Search ............. 237/2 A, 237/8 A, 12.3 B, 5, 12.3 R; 165/244, 202
See application file for complete search history.

(56) References Cited

U.S. PATENT DOCUMENTS

| | | | | |
|---|---|---|---|---|
| 2,156,317 A * | 5/1939 | Smith, Jr. et al. | ......... | 62/176.6 |
| 4,532,894 A * | 8/1985 | Wulf et al. | ............ | 123/142.5 E |
| 4,930,455 A | 6/1990 | Creed et al. | | |
| 5,226,595 A * | 7/1993 | Devera et al. | ............... | 237/2 A |
| 5,392,845 A * | 2/1995 | Honda et al. | ................ | 165/203 |
| 5,779,141 A * | 7/1998 | Okumura et al. | .............. | 236/36 |
| 6,112,543 A * | 9/2000 | Feuerecker et al. | .......... | 62/430 |
| 6,131,652 A * | 10/2000 | Ito et al. | ..................... | 165/204 |
| 6,269,872 B1 | 8/2001 | Anderson | | |
| 6,360,958 B1 * | 3/2002 | Ito et al. | ..................... | 237/2 A |

FOREIGN PATENT DOCUMENTS

| | | |
|---|---|---|
| EP | 1574370 A1 | 9/2005 |
| EP | 1574370 B1 | 3/2007 |
| GB | 2 401 931 A | 11/2004 |
| JP | 62055217 A * | 3/1987 |
| JP | 10311615 A * | 11/1998 |
| JP | 2004360509 A * | 12/2004 |
| WO | WO 03/048548 A1 | 6/2003 |

OTHER PUBLICATIONS

U.S. Appl. No. 10/373,202, filed Feb. 26, 2003, Eisenhour.
R. Eisenhour et al., "HVAC System Analysis Method for Testing", SAE Technical Paper Series 960684, Feb. 26-29, 1996, pp. 7-13.

* cited by examiner

*Primary Examiner*—Steven B McAllister
*Assistant Examiner*—Patrick F. O'Reilly, III
(74) *Attorney, Agent, or Firm*—Foley & Lardner LLP

(57) ABSTRACT

A method and apparatus for automatically adjusting the flow rate of engine coolant through a heater core in an automobile by automatically determining a temperature difference between the temperature of coolant at a first flow rate before it enters a heater core and a temperature of air exiting the heater core and automatically increasing the flow rate of the coolant to a second flow rate higher than the first flow rate if the temperature difference is greater than a first predetermined temperature difference.

32 Claims, 4 Drawing Sheets

| Engine RPM | 1122 | 1459 | 1836 | 2370 | | 2913 | 3426 | 3913 | 4482 |
|---|---|---|---|---|---|---|---|---|---|
| Blower Voltage | 13.4 | 13.4 | 13.4 | 13.4 | | 13.4 | 13.3 | 13.3 | 13.2 |
| Tcil | 81.2 | 82.0 | 82.3 | 83.1 | | 83.1 | 82.6 | 82.4 | 81.2 |
| Two | 67.4 | 71.2 | 73.4 | 75.6 | | 76.8 | 77.5 | 77.9 | 77.4 |
| Evap. Air In Temp | -8.0 | -5.9 | -7.8 | -9.6 | | -10.9 | -10.5 | -9.9 | -8.4 |
| Evap. Air Out Temp | -7.5 | -5.4 | -7.1 | -9.0 | | -10.3 | -9.8 | -9.4 | -7.9 |
| Ambient Temp | -17.8 | -16.5 | -18.1 | -18.2 | | -19.0 | -19.0 | -18.1 | -17.6 |
| FOOT outlet left | 60.2 | 65.8 | 68.4 | 70.4 | | 71.4 | 72.2 | 72.7 | 72.4 |
| FOOT outlet right | 58.4 | 63.4 | 65.8 | 67.7 | | 68.6 | 69.4 | 69.9 | 69.6 |
| Cc/Ch | 0.206094 | 0.152766 | 0.119559 | 0.0946 | HCD 0.026 | 0.078001 | 0.063267 | 0.055224 | 0.047658 |
| UA/Cc | 1.981384 | 2.240239 | 2.375651 | 2.4126 | 2.73 UA/Cc | 2.437504 | 2.469697 | 2.487412 | 2.510086 |
| Outlet Temp. Est | 59.6 | 64.1 | 66.7 | 69.0 | | 70.2 | 71.1 | 71.6 | 71.3 |
| Deviation | 0.4 | 0.5 | 0.5 | 0.1 | | 0.2 | 0.3 | 0.3 | 0.3 |

Fig. 1

Total Cabin Air Volume Flow Rate Table

| Blower Voltage | Mix Percentage | | | | | |
|---|---|---|---|---|---|---|
| | 0% | 20% | 40% | 60% | 80% | 100% |
| 4 | 3.2 | 3.0 | 2.7 | 2.3 | 2.0 | 1.7 |
| 6 | 5.0 | 4.8 | 4.3 | 3.7 | 3.1 | 2.7 |
| 8 | 6.4 | 6.1 | 5.4 | 4.6 | 4.0 | 3.4 |
| 10 | 7.5 | 7.1 | 6.3 | 5.5 | 4.7 | 4.0 |
| 12 | 8.5 | 8.1 | 7.2 | 6.2 | 5.3 | 4.5 |
| 14 | 9.3 | 8.9 | 7.9 | 6.8 | 5.8 | 5.0 |

Fig. 2

Volume Flow Rate Through Heater Core

| Blower Voltage | Mix Percentage | | | | | |
|---|---|---|---|---|---|---|
| | 0% | 20% | 40% | 60% | 80% | 100% |
| 4 | 0.0 | 0.6 | 1.1 | 1.4 | 1.6 | 1.7 |
| 6 | 0.0 | 1.0 | 1.7 | 2.2 | 2.5 | 2.7 |
| 8 | 0.0 | 1.2 | 2.2 | 2.8 | 3.2 | 3.4 |
| 10 | 0.0 | 1.4 | 2.5 | 3.3 | 3.7 | 4.0 |
| 12 | 0.0 | 1.6 | 2.9 | 3.7 | 4.2 | 4.5 |
| 14 | 0.0 | 1.8 | 3.2 | 4.1 | 4.6 | 5.0 |

Fig. 3

% of Reference Airflow Passing Through Core

| Blower Voltage | Mix Percentage | | | | | |
|---|---|---|---|---|---|---|
| | 0% | 20% | 40% | 60% | 80% | 100% |
| 4 | 0% | 12% | 22% | 28% | 32% | 35% |
| 6 | 0% | 20% | 35% | 45% | 51% | 55% |
| 8 | 0% | 25% | 44% | 57% | 65% | 70% |
| 10 | 0% | 29% | 52% | 67% | 76% | 82% |
| 12 | 0% | 33% | 58% | 75% | 86% | 93% |
| 14 | 0% | 36% | 64% | 83% | 95% | 102% |

CONTROL OF COOLANT FLOW RATE FOR VEHICLE HEATING

BACKGROUND OF THE INVENTION

Current climate control systems in automobiles utilize a heater core to heat air that is directed into the cabin of the automobile to provide interior heating. The heater core is typically heated by circulating engine coolant from the engine through the heater core. (Coolant being a term relative to the engine temperature, as the coolant is used to "cool" the engine of the automobile, which is how the coolant obtains the thermal energy used to heat the air passing through the heater core, and thus the coolant is at a high temperature relative to atmospheric temperatures). Typically, the rate of coolant flow through the heater core is governed by various parameters relating to the engine and/or automobile operation and/or coolant pump operation. By way of example, the rate of flow through the heater core may be directly related to engine RPM; the higher the RPM, the higher the coolant flow rate through the heater core. Still further, it may be related to the speed of a coolant pump. Alternatively or in addition to this, the rate of flow of coolant through the heater core may be related to the temperature of the engine. That is, for example, the rate of coolant flow may increase as the temperature of the engine increases. Indeed, in some designs for automobiles, coolant only circulates through the engine (and thus the heater core) when the temperature of the engine has reached a predetermined value. Thus, the rate of flow through the heater core of coolant is variable and controlled by parameters that are not directly related to the required heat output of the heater core. This is sometimes a problem, because by controlling the flow rate of coolant through the heater core solely based on engine parameters, the true need to achieve a minimum circulation rate through the heater core, which may be needed to ensure that the climate control system can provide hot air at an adequate temperature and at an adequate mass flow rate to the cabin, is ignored. Therefore, in some situations, the coolant flow rate may be too low to sufficiently heat the air being directed into the cabin so that the occupants of the cabin will feel comfortable. This is especially the case in situations of extremely cold ambient weather at low engine speeds and/or low coolant pump speeds (and thus low coolant flow rates).

Thus, low coolant flow rate may be a problem because, depending on the ambient temperatures and/or the increase in room temperature that the cabin occupants desire, the heater core may not be able to heat the air being directed into the cabin sufficiently for the occupants to feel comfortable.

One possible solution to the problem of low coolant flow at low engine speeds/low coolant pump speeds might be to simply maintain the flow of coolant through the engine, and thus the heater core, at a higher flow rate. However, this may result in a reduction in fuel efficiency as well as increased wear and tear on automobile components (e.g., a water pump that now must run twice as fast), thus making the automobile less economical, less environmentally friendly and more maintenance intensive.

Therefore, there is a need to better control the flow of coolant through the heater core to better ensure that the heater core is able to provide enough heated air to the cabin of an automobile so that occupants in the cabin feel comfortable, even at extremely cold and low engine/pump speed conditions, in a manner that provides for economical operation of the automobile in both the short and/or long term.

SUMMARY OF THE INVENTION

In a first embodiment of the invention, there is a method for automatically adjusting the flow rate of engine coolant through a heater core in an automobile, comprising automatically determining a temperature difference between the temperature of coolant at a first flow rate before the coolant enters a heater core and a temperature of air exiting the heater core and automatically increasing the flow rate of the coolant to a second flow rate higher than the first flow rate if the temperature difference is greater than a first predetermined temperature difference.

In yet another embodiment of the invention, there is a method for automatically adjusting the flow rate of engine coolant through a heater core in an automobile, comprising automatically obtaining a value indicative of a mix door position, automatically obtaining a value indicative of a flow rate of air through the heater core, automatically obtaining a value indicative of coolant flow rate through the heater core, automatically measuring the temperature of coolant before the coolant enters the heater core, automatically measuring the temperature of air before the air passes through the heater core, automatically determining a temperature of air exiting the heater core based on the automatically obtaining a value indicative of a mix door position, the automatically obtaining a value indicative of a flow rate of air through the heater core, the automatically obtaining a value indicative of coolant flow rate through the heater core, the automatically measured temperature of coolant, and the automatically measured temperature of air, automatically determining a temperature difference between the automatically determined temperature of the coolant before the coolant enters the heater core and the automatically determined temperature of air exiting the heater core, and automatically increasing the flow rate of the coolant if the temperature difference is greater than a predetermined temperature difference.

In yet another embodiment of the invention, there is a method for automatically controlling the climate in the cabin of an automobile, comprising automatically increasing and decreasing the flow rate of coolant entering a heater core based on a temperature difference between the temperature of the coolant before the coolant enters the heater core and the temperature of air exiting the heater core.

In yet another embodiment of the invention, there is a coolant flow control device, comprising an electronic processor and a memory, wherein the memory stores a value for a first predetermined temperature difference, and wherein the processor is adapted to automatically adjust the flow rate of engine coolant through a heater core in an automobile based on an automatically determined temperature difference between the temperature of coolant at a first flow rate before the coolant enters a heater core and a temperature of air exiting the heater core, wherein the processor is further adapted to automatically command an increase in the flow rate of the coolant to a second flow rate higher than the first flow rate if the temperature difference is greater than the stored value for a first predetermined temperature difference.

In another embodiment of the invention, there is an automobile having a device according to any of the below devices.

In another embodiment of the invention, there is an automobile with components adapted to implement any of the above or below methods.

Other embodiments of the present invention include any of the above or below methods when practiced in conjunction with an automobile.

In another embodiment of the invention, there is a coolant flow device, comprising, an electronic processor and a memory, wherein the memory stores a value of a predetermined temperature difference and at least one algorithm based on an equation to automatically determine the temperature of air exiting a heater core, the equation being based on variables including, a temperature of air exiting the heater core, a temperature of coolant at the inlet of the heater core, a temperature of air prior to entering the heater core, a variable ratio of coolant enthalpy per degree and heater core enthalpy per degree, and a variable heater core performance parameter based on Cc/Ch, wherein the electronic processor is adapted to automatically determine the temperature of air leaving the heater core utilizing the algorithm, automatically determine a temperature difference between the temperature of coolant at a first flow rate before the coolant enters the heater core, and automatically issue a command to increase the flow rate of the coolant to a second flow rate higher than the first flow rate if the temperature difference is greater than the stored value of the predetermined temperature difference.

BRIEF DESCRIPTION OF THE DRAWINGS

FIG. 1 shows a table of exemplary empirical results for various coolant flow rates (based on engine speed) and air temperatures that will permit mapping of the performance and characterization of the heater core, at a maximum blower speed.

FIG. 2 shows a table of total airflow mass flow rates for various Mix % values and blower voltages for an exemplary climate control system.

FIG. 3 shows a table of the airflow that passes through the heater core as a function of Mix % and blower voltage for an exemplary climate control system.

DETAILED DESCRIPTION OF THE PREFERRED EMBODIMENTS

Figures 4, 5:
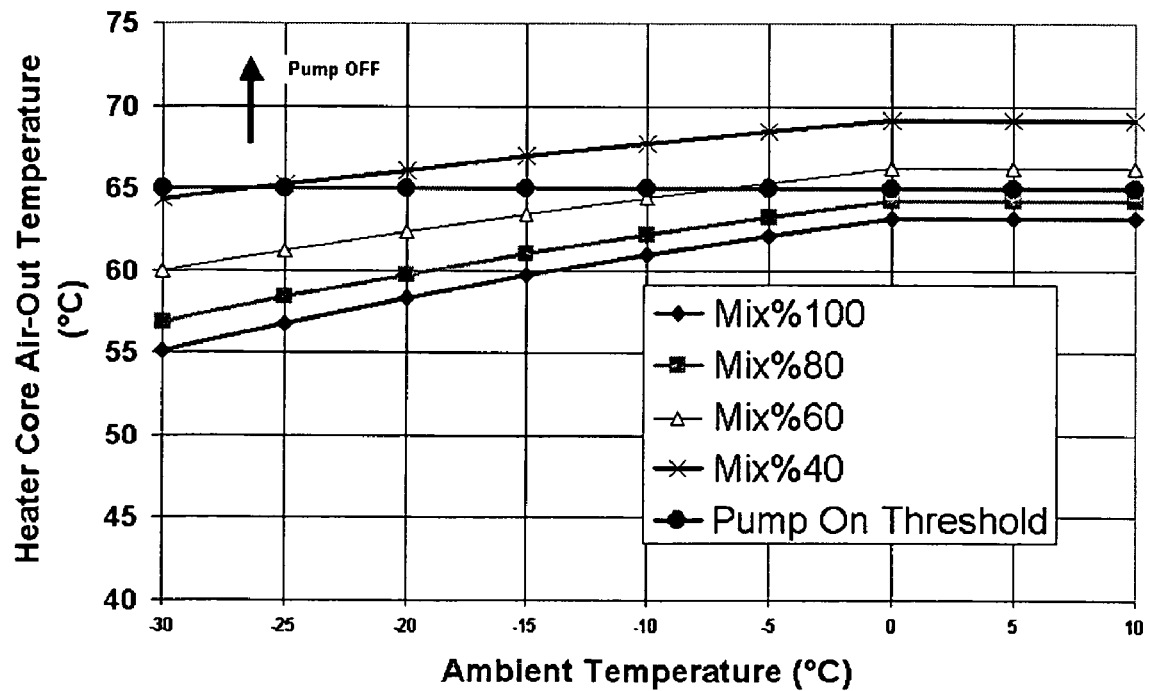
FIG. 4 shows a chart detailing a percentage of reference airflow passing through the heater core for an exemplary climate control system
FIG. 5 shows a graphical representation of how an exemplary control system implemented according to the present invention may behave utilizing an auxiliary electric pump to increase the flow rate of coolant through a heater core.

The present invention provides a system for automatically adjusting the flow rate of engine coolant through a heater core of an automobile (such as but not limited, to a car, an SUV, a minivan, a station wagon, a pickup truck, etc.). More specifically, the present invention permits the flow rate of engine coolant through the heater core of an automobile to be adjusted based on the thermal demand for hot air, produced by the heater core, that is directed into the cabin of an automobile to heat the automobile. To this end, according to a first embodiment of the present invention, the flow rate of engine coolant through the heater core is automatically increased to a higher flow rate for a period of time when the determined temperature difference between the coolant temperature just before the coolant enters the heater core and the temperature of heated air just as it exits the heater core is greater than a predetermined value, thus increasing the amount of heat per unit time that may be transferred to air passing through the heating core. A specific exemplary embodiment of the invention will now be described, after which details of various broader implementations of the invention will be discussed.

A first exemplary embodiment of the present invention may be implemented in an automobile that has an auxiliary coolant pump that will, when activated, increase the flow rate of coolant. That is, the auxiliary pump increases the flow rate of engine coolant above the rate which coolant would flow through the heater core if, for example, only the water (coolant) pump of the engine was operating. In the first embodiment of the invention, the auxiliary pump is activated, thus increasing the flow rate of engine coolant through the heater core, when the temperature difference between the temperature of coolant entering the heater core (as determined prior to activation of the auxiliary pump) and the temperature of air exiting the heater core (again as determined prior to activating the auxiliary pump), is greater than a predetermined temperature difference, which in the first embodiment is 20 degrees C.

By regulating the flow rate of engine coolant to the heater core so that a temperature difference of 20 degrees C. or less between the coolant temperature entering the heater core and the temperature of air exiting the heater core is substantially maintained, the thermal demands on the heater core may be better achieved so that the occupants of the automobile will feel comfortable.

Details of some of the various implementations of the present invention will now be discussed.

First, it is noted that, in the embodiment just described, the flow rate of the engine coolant through the heater core is increased by activating an auxiliary pump. However, other embodiments of the present invention may be practiced by diverting additional coolant into the heater core and/or, for example, by increasing the speed of the main water pump for the engine. Indeed, in some embodiments of the invention, any device or means or method that may be effectively utilized to increase the flow rate of engine coolant through the heater core may be utilized to practice the present invention. Thus, hereinafter, the device/means/method to increase coolant flow rate will be referred to broadly as the "supplemental flow function (SFF)."

As noted above, one embodiment of the present invention relies on the determination of a temperature difference between the temperature of coolant before it enters the heater core and the temperature of the heated air exiting the heater core. In an embodiment of the invention, this temperature difference may be determined when the supplemental flow function is not activated, i.e., when the flow rate through the heater core is a flow rate that is controlled or otherwise determined, based solely on various engine parameters, such as engine RPM, engine temperature, heater water outlet temperatures, various flow control valve states, thermostats in the engine, etc. This flow rate, prior to activation of the supplemental flow function, will be referred to as a first flow rate, which may be a constant flow rate or a variable flow rate (based on engine parameters, etc.).

The present invention thus may rely on the temperature difference between the incoming coolant and the heated air exiting the heater core when the coolant is at the first flow rate to determine whether or not the flow rate of the coolant should be increased.

If the temperature difference between the coolant and the heated air exiting the heater core is determined to be greater than the predetermined amount (e.g., 20 degrees C.) when the coolant is circulated through the heater core at the first flow rate, the flow rate of coolant through the heater core may be automatically increased to a second flow rate higher than the first flow rate by activation of the supplemental flow function. This second flow rate may be a predetermined flow rate which may be based on empirical data indicating that the second flow rate will result in sufficient coolant flow through the heater core so that heated air may be sufficiently supplied to the cabin of the automobile for a given ambient temperature, heated air flow rate, desired cabin room temperature, etc. In some embodiments of the invention, this second flow rate may be a flow rate that is independent of the first flow rate, while in other embodiments of the present invention, this second flow rate may be an increase of a predetermined amount above the first flow rate (i.e., a delta to the first flow rate), whatever that first flow rate may be prior to activation of the supplemental flow function. This increase may be linearly or may be non-linearly related to the first flow rate. Thus, in some embodiments of the present invention, the second flow rate to which the flow rate of the coolant is increased from the first flow rate is any flow rate that will result in a sufficient coolant flow rate to permit the heater core to adequately heat the air used to heat the interior cabin of the automobile.

Figure 7:
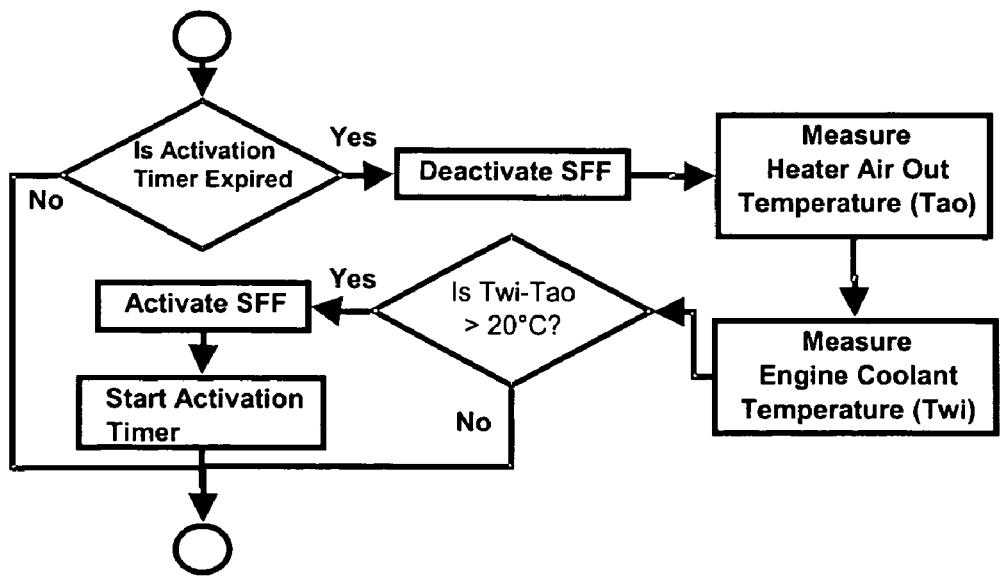
FIG. 7 shows an algorithm for logic for implementing an embodiment of the present invention.

By "determining the temperature difference" between the temperature of the coolant entering the heater core and the temperature of the air exiting the heater core, it is meant any method or apparatus that may be used to measure, estimate, approximate, etc., the temperature difference between the coolant and the heated air that will allow the present invention to be practiced. Thus, in an embodiment of the present invention, the temperature difference may be determined by measuring the temperature of the incoming coolant and the air exiting the heater core. This embodiment may be implemented, for example, by placing a first temperature sensor adjacent to the heater core on the outlet side in the air path of the heated air and placing a second temperature sensor on or in the coolant pipe that provides coolant to the heater core, adjacent to the heater core. Control logic for implementing this embodiment may follow an algorithm according to FIG. 7.

In other embodiments of the present invention, the temperature difference may be estimated. In one embodiment of the invention that utilizes temperature difference estimation, the temperature of the coolant at the first flow rate may be measured as just discussed, and the temperature of the air exiting the heater core may be determined by estimating the temperature of the air exiting the heater core. (This estimate may be based on empirical data that is indicative of the temperature of the heated air exiting the heater core, and is discussed in greater detail below.)

The ability to estimate the outlet temperature of the air flowing through the heater core provides certain advantages other than eliminating the need for a temperature sensor near the heater core. For example, temperature estimates may be used in determining when to selectively deactivate the supplemental flow function, which will now be discussed.

The embodiment of the present invention discussed above to activate the supplemental flow function utilizes a determined temperature difference between the temperature of the incoming coolant at the first flow rate (i.e., prior to implementing the supplemental flow function) and the temperature of the heated air exiting the heater core. To achieve the full advantage of the present invention, the supplemental flow function may be alternately activated and deactivated, thus increasing fuel efficiency and reducing wear on parts.

Figure 8:
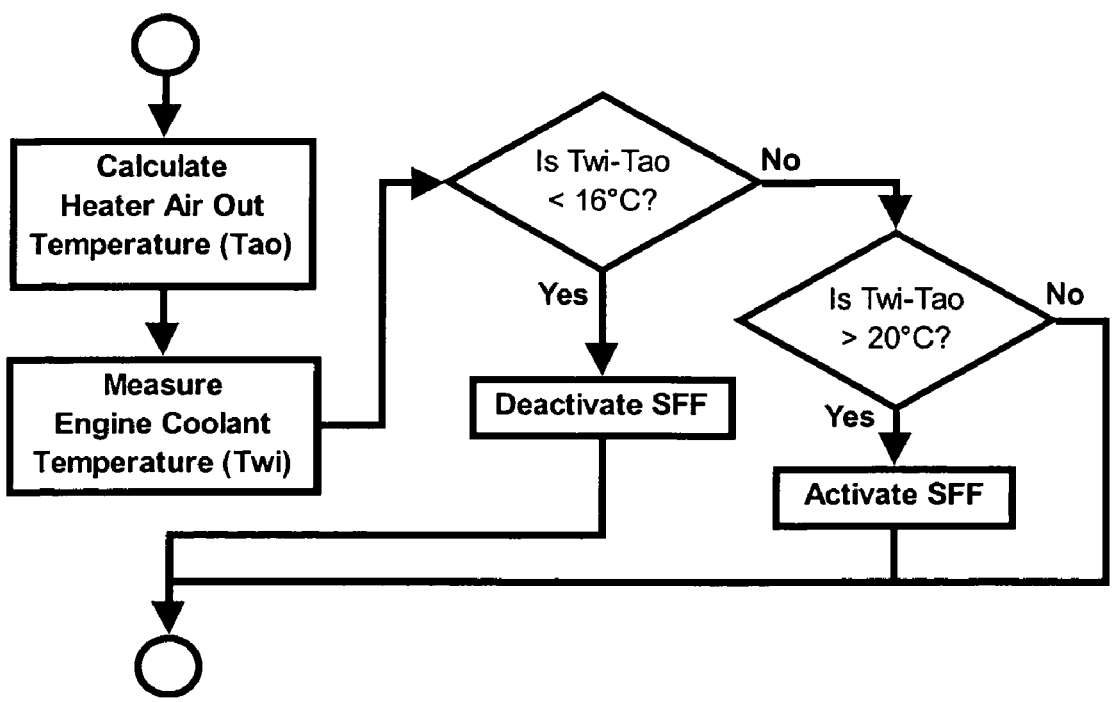
FIG. 8 shows another algorithm for logic for implementing another embodiment of the present invention.

In some embodiments of the invention, the deactivation of the supplemental flow function may be determined utilizing control logic that is based on an estimation of the heater core performance as if the supplemental flow function was disabled. Such control logic may follow an algorithm shown in FIG. 8. This is done because, while determining whether to disable the supplemental flow function, the supplemental flow function is then enabled, and thus actual measurements of the temperature difference between the coolant flow before it enters the heater core and air temperature exiting the heater core with the supplemental flow function disabled cannot be obtained. Thus, these values must be estimated. This estimation may be performed as discussed above. By performing this estimation of the temperature difference, the likelihood that the supplemental flow function would be deactivated while conditions are not sufficient to remain in the deactivated state are substantially reduced and/or eliminated.

The deactivation of the supplemental flow function (SFF) based on the estimation of heater performance will now be presented in an exemplary embodiment. After increasing the flow rate from the first coolant flow rate by activation of the supplemental flow function, while the supplemental flow function is activated, an estimate of the temperature difference between the coolant and the air exiting the heater core is automatically obtained based on the assumption that the coolant is flowing at a flow rate lower than the flow rate present while the supplemental flow function is activated, i.e., the lower flow rate is the rate or about the rate of fluid flow that would be present if the supplemental flow function was deactivated at that time. If it is determined that the estimated temperature difference is less than a predetermined temperature difference, the flow rate of the coolant would then be reduced by deactivating the supplemental flow function.

It is noted that this second predetermined temperature difference (SFF deactivation) may be different than the predetermined temperature difference used to determine when to start the supplemental flow function (SSF). That is, the temperature difference relied on to determine whether or not to activate the supplemental flow function may be different than the temperature difference relied on to determine whether to deactivate the supplemental flow function. In one embodiment of the present invention, this latter temperature difference is less than the former temperature difference. By way of example only and not by way of limitation, the first temperature difference may be a temperature difference of 20 degrees C., while the second temperature difference may be a temperature difference of 16 degrees C. Utilizing different values of temperature difference may prevent rapid reactivation and deactivation of the supplemental flow function. For example, if the temperature difference over a span of, say, 10 seconds, increases from 19 degrees C. to just above 20 degrees C., the supplemental flow function would be activated. If the first and second temperature differences were set to be close to one another, for example, 20 degrees C. and 19 degrees C., respectively, the supplemental flow function would probably almost immediately be deactivated, as the temperature difference might change to just below 19 degrees quickly upon activation of the supplemental flow function. Then, after perhaps 10 or 20 seconds, when the temperature difference drops below 20 degrees C., the supplemental flow function would again be activated. Thus, improved results may be obtained by utilizing a large enough temperature difference between the two temperature differences so that a smoother operation and more efficient operation of the supplemental flow function will result.

The values of the first and second predetermined temperature differences used to implement the present invention in an automobile may be determined based on empirical testing, and thus may be different for various climate systems. However, it has been found that in some embodiments of the present invention, a suitable first temperature difference (SFF activation) is about 20 degrees C. while a suitable second temperature difference (SFF deactivation) is about 16 degrees C. In other embodiments of the present invention, the first predetermined temperature difference is about one-fourth greater than the second predetermined temperature difference.

Another method of controlling the activation and deactivation of the supplemental flow function to implement the present invention is to activate the supplemental flow function for a predetermined period of time, thus increasing the coolant flow rate to the second flow rate, after which the supplemental flow function is deactivated, thus decreasing the flow rate of coolant to a third flow rate lower than the second flow rate. This third flow rate may be the same as the first flow rate, but could also be different. After the deactivation of the supplemental flow function, the temperature difference between the coolant before it enters the heater core and the temperature of the heated air exiting the heater core may then be determined, either by estimating the difference or by measuring the difference, as discussed above. If this temperature difference is greater than a predetermined temperature difference, activation of the supplemental flow function will then commence for another predetermined period of time, which may be the same as or different from the first predetermined period of time.

The optimal periods of activation times may be determined through empirical testing and/or through theoretical calculations. Still further, in other embodiments of the present invention, the optimal periods of reactivation based on a determined temperature difference may also be empirically based or be based on calculations.

Outlet Air Temperature Estimation Bases

Outlet air temperature estimations, and thus estimates of the temperature difference between the coolant before it enters the heater core and the temperature of the air exiting the heater core, may be made/determined based on various factors. The following discussion explains how these factors, many of which may be determined through empirical testing, may be developed and implemented in the present invention.

In one embodiment of the present invention, empirical testing is performed to obtain data which may be used to develop equations, data sets, and/or algorithms that may be used to determine the temperature difference, and thus to determine whether to adjust the flow rate of the engine coolant through the heater core. In other embodiments of the invention, calculations may be performed to develop this data. Still further, in other embodiments of the invention, known values/equations may be used to presume or estimate certain parameters to develop this data. Indeed, some embodiments of the present invention may be practiced by using empirical data obtained by testing every possible scenario of variables that influence the outlet temperature of the heated air such that all that is necessary, when implementing the present invention, is to identify values for these variables and then, utilizing, for example, a lookup table, look up a value for the outlet temperature of the air. Other embodiments of the present invention may be practiced utilizing a combination of empirical test data as well as theoretical computational data obtained based on results from the empirical testing. An embodiment of the present invention that utilizes this latter method will now be described.

An equation to determine the outlet temperature Tao of air exiting the heater core that may be used to implement the present invention is as follows:

$$Tao = [(Tci - (Tci - Tai) \cdot e^{(-UA/Cc \cdot (1 + Cc/Ch))}]/(1 + Cc/Ch) \quad (1)$$

where,
  Tci = The temperature of coolant at the inlet of the heater core,
  Tai = the temperature of the air entering the heater core.

Equation (1) may be used to obtain the temperature of the air exiting the heater core by obtaining temperature values for the temperature of the coolant entering the heater core, Tci, obtaining values for the temperature of the air entering the heater core, Tai, (i.e., the temperature of the air immediately before it is heated), and obtaining values for Cc/Ch and UA/Cc from, for example, a lookup table, for a given coolant flow rate and/or a given air flow rate.

UA/Cc and Cc/Ch in equation (1) are variables that relate to the performance of the heater core, values which may be determined based on empirical data. Cc/Ch is a variable dimensionless ratio of the air flow enthalpy per degree and the coolant flow enthalpy per degree, obtained from tests on the heater core, while UA/Cc is a performance parameter of the heater core, that is directly related to Cc/Ch. Recognizing that heater performance depends on the flow rate ratio between the air and the water, which varies with the flow rate of the coolant through the heater core, as well as the rate of flow of air through the heater core, UA/Cc and Cc/Ch will vary based on the flow rate of coolant through the heater core and the flow rate of air through the heater core. Thus, by utilizing the corresponding value of UA/Cc and Cc/Ch for a given flow rate of coolant through the heater core and flow rate of air through the heater core in equation (1), the temperature of the air leaving the heater core may be determined, at the given flow rate of coolant through the heater core and flow rate of air through the heater core.

Relying on simple energy balance considerations, the equation below may be used to calculate values of Cc/Ch for various inlet and outlet temperatures:

$$Cc/Ch = (Tci - Tco)/(Tao - Tai) \quad (2)$$

with,
  Tci = Temperature of the coolant at the inlet of the heater core,
  Tco = Temperature of the coolant at the outlet of the heater core,
  Tao = Temperature of the air exiting the heater core, and
  Tai = Temperature of the air entering the heater core.

The temperature variables of the coolant and heated air of equation (2) may be determined empirically by placing sensors at coolant and air heater core inlet and outlet points on a test vehicle (or other appropriate test assembly) that will reflect the climate control system in which the present invention is implemented. By obtaining temperature values to be used in equation (2) at various coolant flow rate speeds and various air flow speeds, values for Cc/Ch may be determined for corresponding coolant flow rates and various air mass flow rates that may be used in equation (1) to determine Tao.

It is noted that equation (1) utilizes the coolant flow enthalpy per degree vs. the heater core air flow enthalpy per degree. However, embodiments of the present invention may be practiced utilizing equations that use the inverse of Cc/Ch; Ch/Cc. Thus, some embodiments of the present invention may be practiced by utilizing empirical data to formulate any combination of enthalpy per degree of coolant and airflow, respectively, that will permit the outlet temperature of the air exiting the heater core to be estimated. Still further, recognizing that equation (2) utilizes inlet and outlet temperatures of the coolant and the air with respect to the heater core, an embodiment of the present invention may be practiced by recording some or all of these temperatures at various coolant flow rates and air flow rates, storing these values in a lookup table onboard the automobile, and using the values to determine a value for Cc/Ch. Thus, some embodiments of the present invention may be practiced by utilizing any empirical data points that will permit the temperature of the air exiting the heater core to be estimated to implement coolant flow rate control according to the present invention.

It can be seen, equation (1) contains a second ratio, UA/Cc. This ratio is known as the heater core performance parameter, which is dependent on coolant temperature drop through the heater core. Values for this ratio for various coolant flow rates and heater core air flow rates may be determined based on empirical results, just as was done to determine Cc/Ch, utilizing the equation:

$$UA/Cc = (Tao - Tai)/\Delta T(Im) \quad (3)$$

where, $$\Delta T(Im) = (-Tci + Tco - Tao + Tai)/(\ln[(Tco - Tao)/(Tci - Tai)])$$

By plotting calculated values of UA/Cc vs. Tci−Tco, for the obtained empirical data, with UA/Cc on the vertical axis, a value for the heater core distribution factor, HCD, which serves as an experimentally determined heater core correction factor, may be determined from the slope of the line that estimates the values of UA/Cc. Further, a dimensionless isothermal coolant overall heat transfer coefficient, UA'/Cc, which may be determined from the intercept of the slope of the line that estimates values of UA/Cc (i.e., where Tci−Tco=0).

Once values for UA'/Cc and HDC are determined for a given heater core, equation (4), below, may be used to determine a value of UA/Cc for a given value of Cc/Ch:

$$UA/Cc = UA'/Cc - HCD \cdot Cc/Ch \cdot (Tci - Tai) \quad (4)$$

Thus, by utilizing equation (4) in equation (1), values of Tao may be determined for a given Cc/Ch value and given Tci and Tai values. It is further noted that embodiments of the present invention may be practiced by relying on the teachings contained in SAE Technical Paper Series 960684, entitled "HVAC System Analysis Method for Testing," authored by Eisenhour, Kawakami and Tsunada, presented at the International Congress & Exposition in Detroit Mich. in Feb. 26-29, 1996, the contents of which are incorporated herein by reference in their entirety.

It is further noted that equation (4) can be considered an approximation for HCD·(Tci−Tco), which is HCD·(Cc/Ch)· (Tao−Tai). This correct equation can be solved through iteration with equation (1) above, as both depend on Tao. Since HCD and Cc/Ch tend to be small, the error introduced in UA/Cc by using Tci in place of Tao is small, and thus equation (4) produces acceptable results. (In practice, HCD can be adjusted slightly to take up the error.) Of course, some embodiments of the present invention can be practiced utilizing the correct equations, as would be understood by one of ordinary skill in the art furnished with the knowledge conveyed by this application.

As noted above, values for Cc/Ch to be used in the above equations may be empirically determined for various coolant flow rates and various heater core air flow rates. However, some embodiments of the present invention may be practiced by utilizing values of Cc/Ch obtained by simply empirically determining values of Cc/Ch at the maximum flow rate of air through the heater core, and then scaling the values of Cc/Ch for lower air flow rates. That is, to practice some embodiments of the present invention, all that may be necessary is to obtain values of Cc/Ch that are empirically determined for a maximum air flow rate through the heater core at variable coolant flow rates.

FIG. 1 shows a table of exemplary empirical results for various coolant flow rates and air temperatures that will permit mapping of the performance and characterization of the heater core, at a maximum blower speed blowing air through the heater core, represented by a blower voltage of 13.4 volts, and thus at the maximum air flow rate of air through the heater core with the mix door to the heater core fully open (i.e., no air bypasses the heater core). In the table of FIG. 1, coolant flow rate is correlated to an operational parameter of an automobile, specifically, in this case, engine RPM. In the heater circuit used to obtain the value shown in FIG. 1, the rate of coolant flow increases with increasing engine RPM. As can be seen from FIG. 1, determined values for Cc/Ch vary depending on engine RPM. The higher the RPM, the lower the value of Cc/Ch.

In the embodiments of the invention that utilize values of Cc/Ch that were empirically determined at maximum blower speeds and maximum air mix door opening (i.e., maximum heater core air output), a scaling factor may be utilized to obtain values of Cc/Ch to be used in equation (1) and equation (4) to determine the value of the temperature of air passed through the heater core for lower air mass flow rates through the heater core. Thus, Cc/Ch may be scaled based on the speed of the air through the core and the percentage of air passed through the heater core relative to the airflow rate through the heater core during the empirical testing.

A method of determining such a scaling factor for Cc/Ch will now be discussed. In heater systems for automobiles, there is an air mix door that varies the amount of air that passes through the heater core. During empirical testing to obtain values of Cc/Ch, this mix door may be fully open. The location of this mix door is correlated to a parameter that will be labeled "Mix %." This parameter represents the percentage of the total airflow introduced into the cabin of the automobile through a conditioned air vent that is passed through the heater core. It is noted that the total airflow of air (i.e., the amount of air passing through the heater core plus the amount of air bypassing the heater core) is affected by the location of the mix door, and thus affected by the Mix % value. This is because the heater core itself presents an airflow restriction. Thus, values of total airflow are first determined for various Mix % values at various blower speeds. These total airflow values may be determined empirically and/or by utilizing estimates based on fluid flow equations that account for the airflow restriction presented by the heater core. FIG. 2 shows a table of total cabin airflow mass flow rates (m³/min) for various Mix % values and blower voltages for an exemplary climate control system.

Next, the amount of airflow that passes through the heater core is determined for various door positions. This may be determined by taking the Mix % value and multiplying it by the total airflow. However, in other embodiments of the present invention, the amount of airflow that passes through the heater core may be determined empirically. Still further, in other embodiments of the present invention, the amount of airflow that passes through the heater core may be determined utilizing equations that take into account the airflow restriction presented by the heater core. FIG. 3 shows a table of the airflow that passes through the heater core as a function of Mix % and blower voltage for an exemplary climate control system.

To determine the scaling value for Cc/Ch at various airflow rates passing through the heater core and at various Mix % values, the value of the airflow passing through the heater core at a given Mix % and blower voltage is divided by the total airflow rate when the Mix % is at 100% (i.e., when all of the air that leaves the conditioned air outlet vent has passed through the heater core). This total airflow value may be determined empirically while developing values for Cc/Ch for various coolant flow speeds. FIG. 4 shows a chart detailing a percentage of reference airflow passing through the heater core for an exemplary climate control system. These percentages are then used to scale Cc/Ch to obtain values that will be used to estimate the outlet temperature of the heater core based on a given blower voltage and a given Mix % (i.e., air mix door position) at various automobile component parameters.

As noted above, some embodiments of the present invention may use values of Cc/Ch that are empirically determined for various coolant flow speeds as well as various blower voltages (blower speeds) and Mix % values. Recognizing the time consumption that will be required to obtain such information, some embodiments of the invention may be practiced utilizing values of Cc/Ch determined for a limited number of blower speeds, coolant flow rates, and Mix % values over a range of blower speed rates, coolant flow rates, and mix door positions, and then the "missing" values for Cc/Ch may be determined by interpolation. Thus, values of Cc/Ch to be used in the above equations to estimate the outlet temperature of the air exiting the heater core may be determined in some embodiments in any manner that will allow the control system of the present invention to be practiced with a degree of accuracy that is deemed reasonable under the circumstances.

Identifying Cc/Ch

Some more sophisticated embodiments of the present invention may be practiced by repeatedly determining the scaling factor for Cc/Ch for various blower speeds, mix door positions, and various coolant flow rates onboard the automobile. However, other embodiments of the present invention may be practiced by predetermining the scaling factors for the various flow rates and blower speeds and storing these in a lookup table onboard the automobile. Still further, other embodiments of the present invention may be practiced by scaling the values of Cc/Ch beforehand and storing these scale values in a lookup table onboard the automobile based on blower speed, percent mix, and a given coolant flow rate. Thus, some embodiments of the present invention may be practiced with any means or method to determine values of Cc/Ch or proxy values of Cc/Ch that may be used to estimate the temperature of the air exiting the heater core.

FIG. 5 shows a graphical representation of how an exemplary control system implemented according to the present invention may behave utilizing an auxiliary electric pump to increase the flow rate of coolant through a heater core. From FIG. 5, it can be seen that the mix % favoring full hot air will have a tendency to require SFF activation.

Implementation Logic

Figure 6:
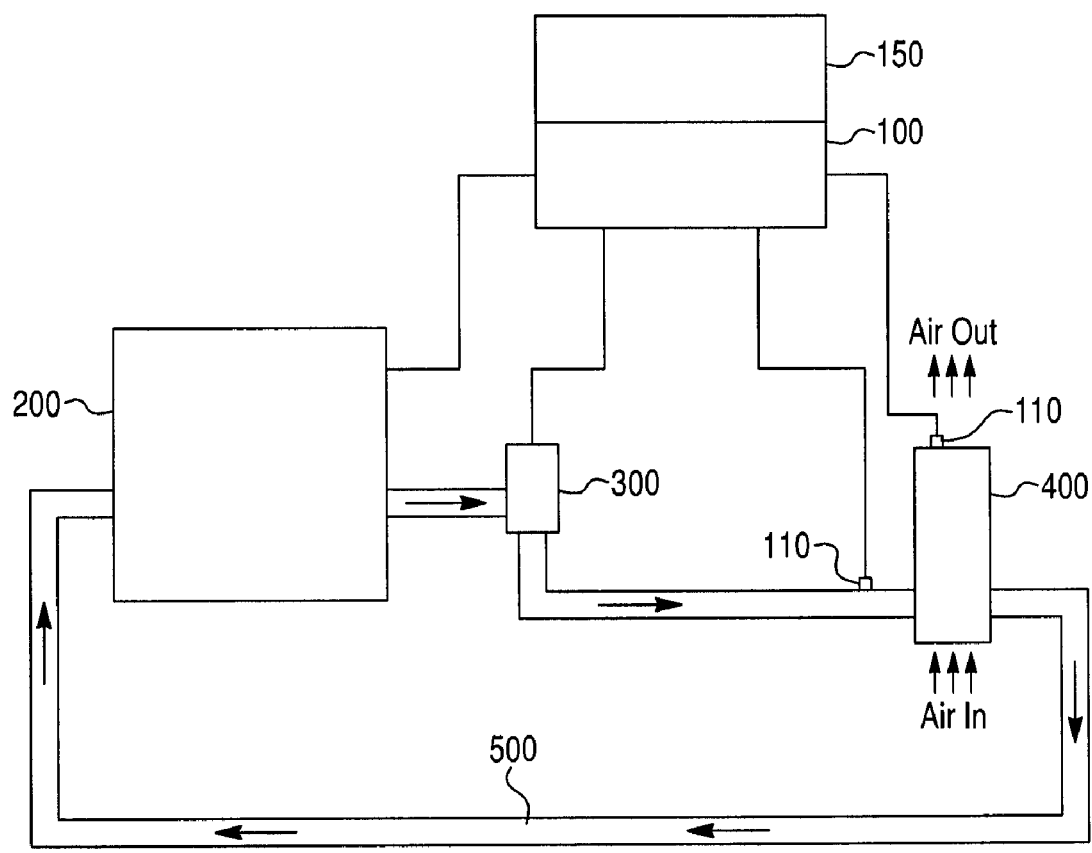
FIG. 6 shows a schematic representation of a coolant flow control device according to an embodiment of the invention.

The present invention includes a method for practicing the invention, software to practice the invention, and apparatuses configured to implement the present invention, including a climate control device for a cabin of an automobile. An exemplary apparatus for practicing the present invention may be seen in FIG. 6, which shows a schematic representation of a coolant flow control device according to an embodiment of the invention. FIG. 6 shows an electronic processor 100, which is in communication with an engine 200, an auxiliary pump 300, the outlet of a heater core 400, a coolant flow pipe 500 at the inlet to the heater core 400, and a memory 150, which may be a part of the processor 100 or may be separate from the processor 100. The processor 100 may be adapted to automatically determine the temperature difference between the temperature of the coolant at the first flow rate before the coolant enters the heater core 400 and a temperature of air exiting the heater core 400, and to automatically command an increase in the flow rate of the coolant to a second flow rate higher than the first flow rate if the temperature difference is greater than a stored predetermined temperature difference stored in the memory 150. Still further, processor 100 may be adapted to utilize an algorithm based on some or all of the equations, variables, and/or constants discussed herein. Memory 150 may store the variables and/or constants that will be used by the processor to automatically implement the present invention. These variables and constants may be stored in look-up tables in the memory. Still further, the memory may store an array of solutions for some or all of the above equations, such that calculations by the processor may be reduced and/or eliminated. Still further, the memory may store solutions to equations in a manner such that all that is necessary is to look-up those solutions based on an array of known values.

Thus, embodiments of the present invention may utilize lookup tables in lieu of and/or in addition to utilizing algorithms based on the equations above. In such embodiments, solutions for a wide range of climate control scenarios (i.e., different variables/constants) may be predetermined and thus stored in a memory, from which these solutions may be looked up based on a provided array of variables. However, other embodiments of the present invention may be practiced utilizing algorithms based on the above equations. Still further, a combination of these may be used to implement the present invention.

FIG. 6 shows that the processor 100 is in communication with temperature sensors 110. In the assembly shown, temperature sensor 110 relays temperature information from the sensor to processor 100. Still further, FIG. 6 shows that processor 100 is also in communication with auxiliary pump 300, to which it may send commands to increase the flow rate or to decrease the flow rate of coolant through the heater core 400. The processor 100 may also be in communication with the engine 200, to determine a parameter of the engine that is indicative of the rate of fluid flow through the heater core. Alternatively or in addition to this, the processor may be in communication with a device, such as a flow meter, that measures the flow rate of coolant and reports this measured flow rate to the processor 100.

The coolant flow device, methods, and software according to the present invention may be utilized in conjunction with a climate control device of an automobile. By way of example only and not by way of limitation, the methods and apparatuses and software according to the present invention may be utilized in a system for automatically controlling a climate in a cabin of an automobile according to U.S. patent application Ser. No. 10/373,202 to Eisenhour, filed on Feb. 26, 2003, entitled, Dual Zone Automatic Climate Control Algorithm Utilizing Heat Flux Analysis, the contents of which are incorporated by reference herein in their entirety. Thus, some embodiments of the present invention include providing conditioned air to the cabin from a conditioned air outlet, where the present invention is utilized to ensure or otherwise improve the chances that an adequate outlet temperature will be achieved.

It is further noted that when referring to an algorithm based on the above equations, it is meant any routine or equation(s) that may be derived or extrapolated from the above equations, including equations developed (or similar equations) to formulate other equations that may be used to practice the invention.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A method for automatically adjusting the flow rate of engine coolant through a heater core in an automobile, comprising:
   automatically determining a temperature difference between the temperature of coolant at a first flow rate before the coolant enters a heater core and a temperature of air exiting the heater core, the temperature difference being determined prior to activation of an auxiliary pump;
   automatically increasing the flow rate of the coolant to a second flow rate higher than the first flow rate with the auxiliary pump if the temperature difference is greater than a first predetermined temperature difference; and
   automatically deactivating the auxiliary pump if the temperature difference is less than a second predetermined temperature difference, the second predetermined temperature difference being less than the first predetermined temperature difference.

2. The method of claim 1, wherein the temperature difference is determined by measuring the temperatures of the coolant entering the heater core and the air exiting the heater core.

3. The method of claim 1, wherein the temperature of the coolant at the first flow rate is determined by measuring the temperature of the coolant, and wherein the temperature of the air exiting the heater core is determined by estimating the temperature of the air exiting the heater core.

4. The method of claim 1, further comprising: decreasing the flow rate of the coolant from the second flow rate to a third flow rate lower than the second flow rate after the coolant flows at the second flow rate for a predetermined period of time.

5. A method for automatically controlling the climate in a cabin of an automobile, comprising: automatically adjusting the flow rate of engine coolant through a heater core according to claim 1; and providing heated air to the cabin from the heater core.

6. The method of claim 1, wherein the temperature of air exiting the heater core is estimated.

7. The method of claim 6, wherein the estimate for the temperature of air exiting the heater core is based on the percentage of the total conditioned air introduced into the cabin that passes through the heater core.

8. The method of claim 7, wherein the estimate for the temperature of air exiting the heater core is based on the mass flow rate of air passing through the heater core.

9. The method of claim 6, wherein the estimate for the temperature of air exiting the heater core is based on a blower speed that blows conditioned air into the cabin.

10. The method of claim 6, wherein the estimate for the temperature of air exiting the heater core is based on empirical data previously obtained relating to at least one operational parameter of an automobile component affecting coolant flow rate.

11. The method of claim 6, wherein the estimate for the temperature of air exiting the heater core is based on the enthalpy per degree of coolant flowing through the heater core and the enthalpy per degree of air flowing through the heater core.

12. The method of claim 11, wherein the estimate for the temperature of air exiting the heater core is based on a predetermined ratio of the enthalpy per degree of coolant flowing through the heater core and the enthalpy per degree of air flowing through the heater core.

13. The method of claim 6, wherein the estimate for the temperature of air exiting the heater core is based on a measured temperature of air entering the heater core.

14. The method of claim 6, wherein the estimate for the temperature of air exiting the heater core is based on a measured temperature of coolant entering the heater core.

15. The method of claim 6, wherein the estimate for the temperature of air exiting the heater core is based on a heater core distribution factor.

16. A method for automatically adjusting the flow rate of engine coolant through a heater core in an automobile, comprising:
   automatically determining a temperature difference between the temperature of coolant at a first flow rate before the coolant enters a heater core and a temperature of air exiting the heater core;
   automatically increasing the flow rate of the coolant to a second flow rate higher than the first flow rate if the temperature difference is greater than a first predetermined temperature difference; and
   after increasing the coolant flow rate from the first coolant flow rate, automatically estimating a temperature difference between the temperature of coolant before the coolant enters the heater core and temperature of air exiting the heater core as if the coolant was at a third flow rate lower than the second flow rate; and if the estimated temperature difference is less than a second predetermined temperature difference, reducing the flow rate of the coolant to about the third flow rate.

17. The method of claim 16, wherein the first predetermined temperature difference is greater than the second predetermined temperature difference.

18. The method of claim 17, wherein the first predetermined temperature difference is about 20° C.

19. The method of claim 16, wherein the first predetermined temperature difference is about $¼^{th}$ greater than the second predetermined temperature difference.

20. The method of claim 16, further comprising: after reducing the flow rate of the coolant to about the third flow rate, automatically determining a second temperature difference between the temperature of the coolant before the coolant enters the heater core and a temperature of air exiting the heater core by measuring the temperatures of the coolant entering the heater core and the temperature of the air exiting the heater core; and automatically increasing the flow rate of the coolant if the second temperature difference is greater than the first predetermined temperature difference.

21. A method for automatically adjusting the flow rate of engine coolant through a heater core in an automobile, comprising:
   automatically determining a temperature difference between the temperature of coolant at a first flow rate before the coolant enters a heater core and a temperature of air exiting the heater core;

automatically increasing the flow rate of the coolant to a second flow rate higher than the first flow rate if the temperature difference is greater than a first predetermined temperature difference;

decreasing the flow rate of the coolant from the second flow rate to a third flow rate lower than the second flow rate after the coolant flows at the second flow rate for a predetermined period of time; and after decreasing the flow rate of the coolant from the second flow rate to the third flow rate, automatically determining a second temperature difference between the temperature of coolant before the coolant enters the heater core and a temperature of air exiting the heater core; and automatically increasing the flow rate of the coolant if the second temperature difference is greater than the first predetermined temperature difference.

22. The method of claim 21, wherein the second temperature difference is determined by measuring the temperatures of the coolant entering the heater core and the air exiting the heater core.

23. A method for automatically adjusting the flow rate of engine coolant through a heater core in an automobile, comprising:

automatically determining a temperature difference between the temperature of coolant at a first flow rate before the coolant enters a heater core and a temperature of air exiting the heater core;

automatically increasing the flow rate of the coolant to a second flow rate higher than the first flow rate if the temperature difference is greater than a first predetermined temperature difference; and wherein the temperature of air exiting the heater core is estimated;

wherein the estimate for the temperature of air exiting the heater core is based on the enthalpy per degree of coolant flowing through the heater core and the enthalpy per degree of air flowing through the heater core;

wherein the estimate for the temperature of air exiting the heater core is based on a predetermined ratio of the enthalpy per degree of coolant flowing through the heater core and the enthalpy per degree of air flowing through the heater core;

wherein the predetermined ratio used as a basis to estimate the temperature of air exiting the heater core varies with respect to at least one variable operational parameter of an automobile component affecting coolant flow rate.

24. The method of claim 23, further comprising automatically scaling the ratio based on a percentage of the total conditioned air introduced into the cabin that passes through the heater core and a blower speed that blows conditioned air into the cabin.

25. The method of claim 23, wherein the ratio is further based on a percentage of the total conditioned air introduced into the cabin that passes through the heater core and a blower speed that blows conditioned air into the cabin.

26. The method of claim 23, wherein the temperature estimate is further based on an effective overall heat transfer coefficient of the heater core.

27. A method for automatically adjusting the flow rate of engine coolant through a heater core in an automobile, comprising:

automatically obtaining a value indicative of a mix door position;

automatically obtaining a value indicative of a flow rate of air through the heater core;

automatically obtaining a value indicative of coolant flow rate through the heater core;

automatically measuring the temperature of coolant before the coolant enters the heater core;

automatically measuring the temperature of air before the air passes through the heater core;

automatically determining a temperature of air exiting the heater core based on the automatically obtained value indicative of the mix door position, the automatically obtained value indicative of the flow rate of air through the heater core, the automatically obtained value indicative of the coolant flow rate through the heater core, the automatically measured temperature of coolant, and the automatically measured temperature of air;

automatically determining a temperature difference between the automatically measured temperature of the coolant before the coolant enters the heater core and the automatically determined temperature of air exiting the heater core; and automatically increasing the flow rate of the coolant if the temperature difference is greater than a predetermined temperature difference.

28. A method for automatically adjusting the flow rate of engine coolant through a heater core in an automobile, comprising:

utilizing an algorithm relating to at least the equation:

$$Tao=[(Tci-(Tci-Tai)\cdot e^{(-UA/Cc\cdot(1+Cc/Ch))}]/(1+Cc/Ch) \qquad (1)$$

where,

Tao=a temperature of air exiting the heater core,

Tci=a temperature of coolant at the inlet of the heater core,

Tai=a temperature of air prior to entering the heater core,

Cc/Ch=a variable ratio of coolant enthalpy per degree and heater core enthalpy per degree, and UA/Cc=a variable heater core performance parameter based on Cc/Ch;

automatically determining Tao of air passing through the heater core utilizing the algorithm;

automatically determining a temperature difference between the temperature of coolant at a first flow rate before the coolant enters the heater core and Tao; and automatically increasing the flow rate of the coolant to a second flow rate higher than the first flow rate if the temperature difference is greater than a predetermined temperature difference.

29. The method of claim 28, wherein the value of Cc/Ch used in the algorithm is determined at least based on a blower speed and a coolant flow rate.

30. The method of claim 29, wherein the value of Cc/Ch used in the algorithm is further based on a percentage of air introduced into the cabin that passes through the heater core.

31. A program product for automatically adjusting the flow rate of engine coolant through a heater core in an automobile, comprising machine-readable program code for causing, when executed, a machine to perform the following method actions:

automatically determining a temperature difference between the temperature of coolant at a first flow rate before the coolant enters a heater core and a temperature of air exiting the heater core, the temperature difference being determined prior to activation of an auxiliary pump;

automatically increasing the flow rate of the coolant to a second flow rate higher than the first flow rate with the auxiliary pump if the temperature difference is greater than a first predetermined temperature difference; and automatically deactivating the auxiliary pump if the temperature difference is less than a second predetermined temperature difference, the second predetermined temperature difference being less than the first predetermined temperature difference.

32. The program product of claim 31, further causing, when executed, a machine to perform the following method actions: after increasing the coolant flow rate from the first coolant flow rate, automatically estimating a temperature difference between the temperature of coolant before the coolant enters the heater core and temperature of air exiting the heater core as if the coolant was at a third flow rate lower than the second flow rate; and if the estimated temperature difference is less than the second predetermined temperature difference, reducing the flow rate of the coolant to about the third flow rate.

* * * * *